(12) United States Patent
Ergen

(10) Patent No.: US 12,363,553 B2
(45) Date of Patent: Jul. 15, 2025

(54) TARGETED MICROCELL INSTALLATIONS FOR CELLULAR NETWORK GAPS

(71) Applicant: DISH Wireless L.L.C., Littleton, CO (US)

(72) Inventor: Christopher Ergen, Littleton, CO (US)

(73) Assignee: DISH Wireless L.L.C., Littleton, CO (US)

( * ) Notice: Subject to any disclaimer, the term of this patent is extended or adjusted under 35 U.S.C. 154(b) by 407 days.

(21) Appl. No.: 18/052,659

(22) Filed: Nov. 4, 2022

(65) Prior Publication Data

US 2023/0143952 A1    May 11, 2023

Related U.S. Application Data

(60) Provisional application No. 63/276,324, filed on Nov. 5, 2021.

(51) Int. Cl.
| | |
|---|---|
| *H04W 8/18* | (2009.01) |
| *H04W 16/18* | (2009.01) |
| *H04W 24/02* | (2009.01) |
| *H04W 24/08* | (2009.01) |
| *H04W 24/10* | (2009.01) |
| *H04W 64/00* | (2009.01) |
| *H04W 84/02* | (2009.01) |
| *H04W 88/02* | (2009.01) |
| *H04W 88/08* | (2009.01) |
| *H04W 88/12* | (2009.01) |

(Continued)

(52) U.S. Cl.
CPC .............. *H04W 16/18* (2013.01); *H04W 8/18* (2013.01); *H04W 24/02* (2013.01); *H04W 24/08* (2013.01); *H04W 24/10* (2013.01); *H04W 64/003* (2013.01); *H04W 84/02* (2013.01); *H04W 88/02* (2013.01); *H04W 88/08* (2013.01); *H04W 88/12* (2013.01); *H04W 88/18* (2013.01); *H04W 92/02* (2013.01); *H04W 92/10* (2013.01); *H04W 92/12* (2013.01)

(58) Field of Classification Search
CPC ......... H04B 17/0082–409; H04L 41/02–5096; H04L 43/02–55; H04W 8/005–30; H04W 16/02–32; H04W 24/02–10; H04W 64/003–006; H04W 84/005–22; H04W 88/005–188; H04W 92/02–24

See application file for complete search history.

(56) References Cited

U.S. PATENT DOCUMENTS

2011/0212721 A1 *   9/2011   Chang .................... H04W 24/08

FOREIGN PATENT DOCUMENTS

JP       2012213159 A   * 11/2012   ............ H04W 16/18

* cited by examiner

*Primary Examiner* — Timothy J Weidner
(74) *Attorney, Agent, or Firm* — Kilpatrick Townsend & Stockton LLP

(57) ABSTRACT

Various arrangements for decreasing cellular network dead spots using microcells are detailed. A geographic map indicative of cellular network performance may be created. Using the geographic map, an area that has a cellular network dead spot can be identified. A subscriber database can be used to identify a subscriber address that is in a location to extend the cellular network within the dead spot. Based on analyzing the subscriber database to identify the subscriber address that is in the location to extend the cellular network, a microcell can be caused to be deployed at the subscriber address. Cellular services can then be provided using the microcell to various pieces of user equipment.

20 Claims, 6 Drawing Sheets

(51) Int. Cl.
*H04W 88/18* (2009.01)
*H04W 92/02* (2009.01)
*H04W 92/10* (2009.01)
*H04W 92/12* (2009.01)

TARGETED MICROCELL INSTALLATIONS FOR CELLULAR NETWORK GAPS

CROSS-REFERENCE TO RELATED APPLICATIONS

This application claims priority to Provisional U.S. Patent Application No. 63/276,324 filed Nov. 5, 2021, entitled "TARGETED MICROCELL INSTALLATIONS FOR CELLULAR NETWORK GAPS," the entire disclosure of which is hereby incorporated by reference, for all purposes, as if fully set forth herein.

BACKGROUND

Cellular networks function using base stations distributed over a geographic area. As the frequencies used for cellular communication increase, the effective geographic area in which a base station can provide cellular service decreases. Therefore, a greater number of cellular base stations need to be deployed to cover the geographic area. Further, there is an increased likelihood that locations will exist where it is difficult to communicate with a cellular base station, possibly resulting in dropped calls and/or low data transmission rates.

SUMMARY

Various embodiments are described related to a method for decreasing cellular network dead spots using microcells. In some embodiments, a method for decreasing cellular network dead spots using microcells is described. The method may comprise creating, by a cellular network, a geographic map indicative of cellular network performance. The method may comprise using, by the cellular network, the geographic map to identify an area that has a dead spot. The method may comprise analyzing, by the cellular network, a subscriber database to identify a subscriber address that may be in a location to extend the cellular network within the dead spot. The subscriber database may identify a plurality of subscribers of the cellular network. The method may comprise, based on analyzing the subscriber database to identify the subscriber address that may be in the location to extend the cellular network, deploying a microcell at the subscriber address. The method may comprise providing, via the microcell, cellular services to a plurality of user equipment.

Embodiments of such a method may include one or more of the following features: creating the geographic map may be based on tracking locations of dropped calls that may occur for user equipment using the cellular network. Creating the geographic map may comprise measuring, by user equipment, signal strengths of signals from base stations of the cellular network. Creating the geographic map may comprise determining, by the user equipment, locations for the measured signal strengths. Creating the geographic map may comprise transmitting the measured signals strengths with the determined locations to the cellular network. The location to extend the cellular network within the dead spot may be located such that coverage provided by the microcell overlaps with coverage provided by the cellular network and extends into the dead spot. The method may further comprise after deploying the microcell, analyzing, by the cellular network, the subscriber database to identify a second subscriber address that may be in a second location that overlaps coverage with the microcell and may be in a second location to further extend the cellular network into the dead spot. The method may further comprise based on analyzing the subscriber database to identify the second subscriber address that may be in the second location to extend the cellular network, deploying a second microcell at the second subscriber address. The method may further comprise providing, via the second microcell, cellular services to the plurality of user equipment. The method may further comprise analyzing, by the cellular network, a map of broadband access. Deploying the microcell at the subscriber address may be further based on broadband access being available at the subscriber address based on the map of broadband access. The method may further comprise analyzing, by the cellular network, a map of structures that may identify heights of structures and densities of structures. Deploying the microcell at the subscriber address may be further based on structure height, structure density, or both at the subscriber address based on the map of structures. The method may further comprise in response to identifying the dead spot, deploying, by the cellular network, a vehicle to perform precision mapping of the dead spot. Analyzing the subscriber database to identify the subscriber address that may be in the location to extend the cellular network within the dead spot may be based on the precision mapping. The cellular network may be a 5G New Radio (NR) cellular network. The microcell may create a 5G cell accessible by the plurality of user equipment or a WiFi network.

In some embodiments, a cellular network system is described. The system may comprise a cellular network comprising a plurality of base stations. The system may comprise a microcell deployment system configured to create a geographic map indicative of cellular network performance. The microcell deployment system may be configured to use the geographic map to identify an area that has a dead spot. The microcell deployment system may be configured to analyze a subscriber database to identify a subscriber address that may be in a location to extend the cellular network within the dead spot. The subscriber database may identify a plurality of subscribers of the cellular network. The microcell deployment system may be configured to, based on analyzing the subscriber database to identify the subscriber address that may be in a location to extend the cellular network, request a microcell to be deployed at the subscriber address. The system may comprise a plurality of microcells. The plurality of microcells, comprising the requested microcell deployed at the subscriber address, may be used to provide cellular services to a plurality of user equipment.

Embodiments of such a system may include one or more of the following features: the microcell deployment system may be configured to create the geographic map based on tracking locations of dropped calls that occur for user equipment using the cellular network. The system may further comprise a plurality of user equipment (UE), each UE of the plurality of UE configured to measure signal strengths of signals from base stations of the cellular network. The system may be further configured to determine locations for the measured signal strengths. The system may be further configured to transmit the measured signals strengths with the determined locations to the cellular network. The location to extend the cellular network within the dead spot may be determined to be located by the microcell deployment system such that coverage provided by the microcell overlaps with coverage provided by the cellular network via a base station of the plurality of base stations and extends into the dead spot. The microcell deployment system may be further configured to, after deploying the microcell, analyze the subscriber database to identify a second subscriber address that may be in a second location that may overlap coverage with the microcell and may be in a location to further extend the cellular network into the dead spot. The microcell deployment system may be further configured to, based on analyzing the subscriber database to identify the second subscriber address that may be in the second location to extend the cellular network, request a second microcell be deployed at the second subscriber address. The cellular network may provide cellular services to the plurality of user equipment using the second microcell. The microcell deployment system may be further configured to analyze a map of broadband Internet access. Requesting deployment of the microcell at the subscriber address may be further based on broadband access being available at the subscriber address based on the map of broadband Internet access. The microcell deployment system may be further configured to analyze a map of structures that may identify heights of structures and densities of structures. Requesting deployment of the microcell at the subscriber address may be further based on structure height, structure density, or both at the subscriber address based on the map of structures. The system may further comprise a cellular network operator vehicle configured to perform precision mapping of the dead spot. The microcell deployment system being configured to analyze the subscriber database to identify the subscriber address that may be in the location to extend the cellular network within the dead spot may be based on the precision mapping. The cellular network may be a 5G New Radio (NR) cellular network. The microcell may create a 5G cell accessible by the plurality of user equipment.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
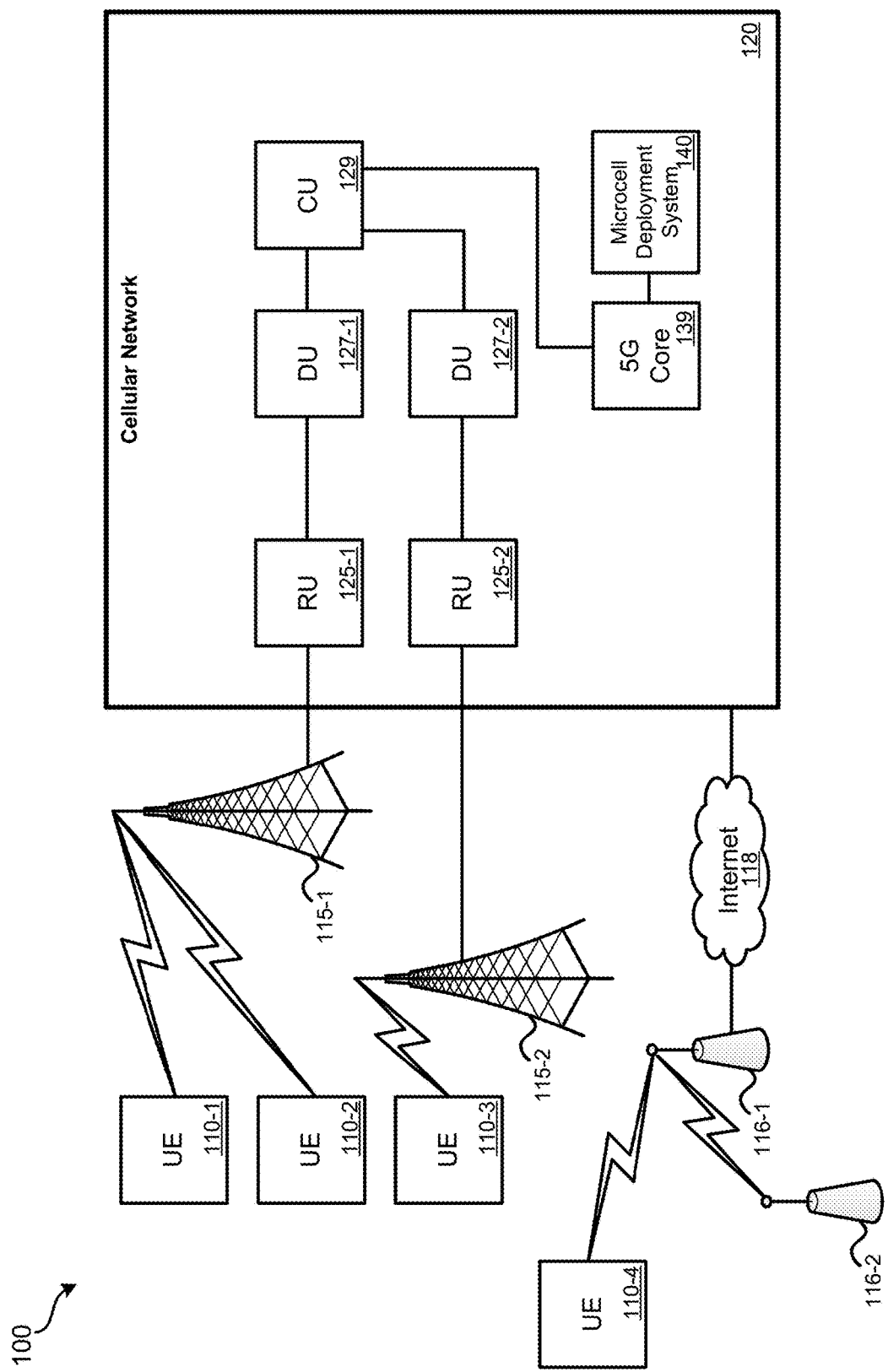
FIG. 1 illustrates an embodiment of a cellular network having a microcell deployment system.

A cellular network, especially a cellular network that relies on higher frequency communication compared to other cellular networks, may experience various dead spots. A dead spot (also referred to as a dead zone) can refer to an area where no coverage or little coverage (e.g., at significantly reduced data uplink and/or downlink data transmission rates) is available. For instance, between two base stations, a location may exist where a cellular telephone call is likely to be dropped by a user equipment (UE) or exchanging data with a base station is not possible or is at a low data transmission rate. Since higher frequencies tend to attenuate more rapidly and are more easily obstructed by objects, 5G New Radio (NR) cellular networks may experience an increase in dead spots if higher frequency communication is used, even if a greater number of base stations are deployed.

To supplement coverage provided by cellular network base stations, microcells may be deployed. A microcell can extend coverage of the cellular network over a relatively smaller area compared to a base station. A microcell operates at a significantly reduced power level compared to a base station and may use the same or a different radio access technology (RAT) to communicate with UE.

A cellular network may perform an analysis of data collected via the cellular network to create a map indicative of dead spots of the cellular network. Data used can include the locations of dropped calls and/or signal strength measurements made using UE. The map of dead spots can be compared with addresses of cellular network subscribers that might be candidates for installation of a microcell. A goal of the installation of a microcell at a subscriber's address may be to continuously extend the cellular network into the dead spot, especially if a single microcell will provide insufficient coverage to eliminate the dead spot. That is, having a small area of coverage within a larger dead spot may be of limited value; rather, a goal may be to continuously extend coverage of the cellular network to cover at least part of the dead spot. Addresses of subscribers may be targeted for microcell installation based on various factors, including: the address of the subscriber having access to broadband Internet access (i.e., high-speed Internet access that is always on and faster than the traditional dial-up access, being a minimum of at least 25 Mbps download and 3 Mbps upload); a height of a structure at the subscriber's address; a density of structures near the subscriber's address; and/or a likelihood that an installed microcell will overlap coverage with the cellular network and also extend coverage into the dead spot.

Targeting of microcell installation may be performed in multiple stages. In a first stage, microcells may be targeted for installation at subscriber locations that overlap coverage of the cellular network. After those one or more microcells have been installed, the dead spot may be remapped. A second stage of microcells may then be targeted for installation subscriber locations that overlap the coverage created by the first stage of microcells to help further reduce the size or existence of the dead spot. More stages may be performed as needed over time to eliminate or reduce the size of the dead spot.

Subscribers or other parties may be incentivized to host a microcell for multiple reasons. First, the microcell may help provide superior coverage. Second, based on the volume of data traffic, uptime, range, and/or type of microcell, the subscriber may receive some form of compensation.

FIG. 1 illustrates an embodiment of a cellular network system 100 ("system 100") that has a microcell deployment system. System 100 can include a 5G New Radio (NR) cellular network or other types of cellular networks that permit slicing are also possible (e.g., future 6G and beyond cellular networks). System 100 can include: UE 110 (UE 110-1, UE 110-2, UE 110-3, 110-4); base station 115; cellular network 120; radio units 125 ("RUs 125"); distributed units 127 ("DUs 127"); centralized unit 129 ("CU 129"); 5G core 139, and microcell deployment system 140. FIG. 1 represents a component level view. In an open radio access network (O-RAN), because components can be implemented as software on a cloud-computing platform, except for components that need to receive and transmit RF, the functionality of the various components can be shifted among different servers and/or data centers to accommodate where the functionality of such components is needed and/or where processing, storage, and/or bandwidth is available.

UE 110 can represent various types of end-user devices, such as smartphones, cellular modems, cellular-enabled computerized devices, sensor devices, gaming devices, access points (APs), any computerized device capable of communicating via a cellular network, etc. Depending on the location of individual UE, UE 110 may use RF to communicate with various base stations (BSs) of cellular network 120. As illustrated, two base stations 115 (BS 115-1, 115-2) are illustrated. Real-world implementations of system 100 can include many (e.g., thousands) of base stations, RUs, DUs, and CUs. BS 115 can include one or more antennas that allow RUs 125 to communicate wirelessly with UE 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. Base station equipment 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of spectrum, such as, for example, band n71. One or more DUs, such as DU 127-1, may communicate with CU 129. Collectively, RUs, DUs, and CUs create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

Multiple slices may function on the underlying hardware detailed in FIG. 1. That is, UE 110-1 and UE 110-2, while communicating with the same base station, may be provided with different QoS/QoE levels of service by virtue of being assigned to different slices. Each slice may be associated with differing performance characteristics. For each slice, many characteristics or parameters may be defined, such as: downlink/uplink throughput (aggregate for network slice); downlink/uplink throughput (per UE); maximum downlink/uplink throughput; maximum supported packet size; mission critical level (e.g., compared to other network slices); radio spectrum; packet error rate; supported access technologies; supported device velocity for a defined QoS; uplink throughput (aggregate for network slice); maximum uplink throughput; and/or synchronicity. Other parameters for a slice may also be defined, such as: a defined latency range for specific end-points; reserved or shared spectrum; one or more particular security profiles; optimization for specific applications or sets of applications (e.g., healthcare applications, industrial applications); optimization for high-speed mobility; and varying degrees of customer-side control of network parameters. Other parameters may also be defined, such as parameters for individual layers within each network slice. Such individual layers may allow for particular types of data or data associated with particular applications to be prioritized over other applications.

Microcells 116 can be installed at various locations, such as within or near areas where a dead spot is present between base stations 115. While base stations 115 may provide the majority of coverage for the cellular network, dead spots may be present where reduced service or no cellular service is available. Microcells may use the same radio access technology, such as 5G, or different radio access technology, such as Wi-Fi, to provide access to cellular network 120. Microcells 116 may communicate via Internet 118 with cellular network 120, or via some other private and/or public network. It may be possible that a microcell is not connected with the Internet or any other network directly. Rather, for example, microcell 116-2 may relay data wirelessly with microcell 116-1, which is connected to Internet 118 or some other network.

Regardless of the radio access technology that Microcells 116 use, UE 110 may be able to transition between communicating with cellular network 120 using base stations 115 and Microcells 116. In general, Microcells 116 may have a much smaller effective communication range with UE 110 than base stations 115. For example, the RF power output by the antennas of microcells 116 may be limited to less than 20 W.

Integrated as part of cellular network 120, or in communication with cellular network 120, may be microcell deployment system 140. In some embodiments, microcell deployment system 140 may be in communication with 5G core 139 of cellular network 120. In other embodiments, microcell deployment system 140 may communicate with some other components or network functions of cellular network 120. Similar to the components of cellular network 120, microcell deployment system 140 may be implemented as a cloud-based process that is executed using a cloud computing platform (which utilizes physical computing resources resident at data centers available for use by clients of the cloud computing platform). In other embodiments, the cellular network operator may directly execute microcell deployment system 140 using one or more computer server systems. Further detail regarding microcell deployment system 140 is provided in relation to FIG. 5.

Figure 2:
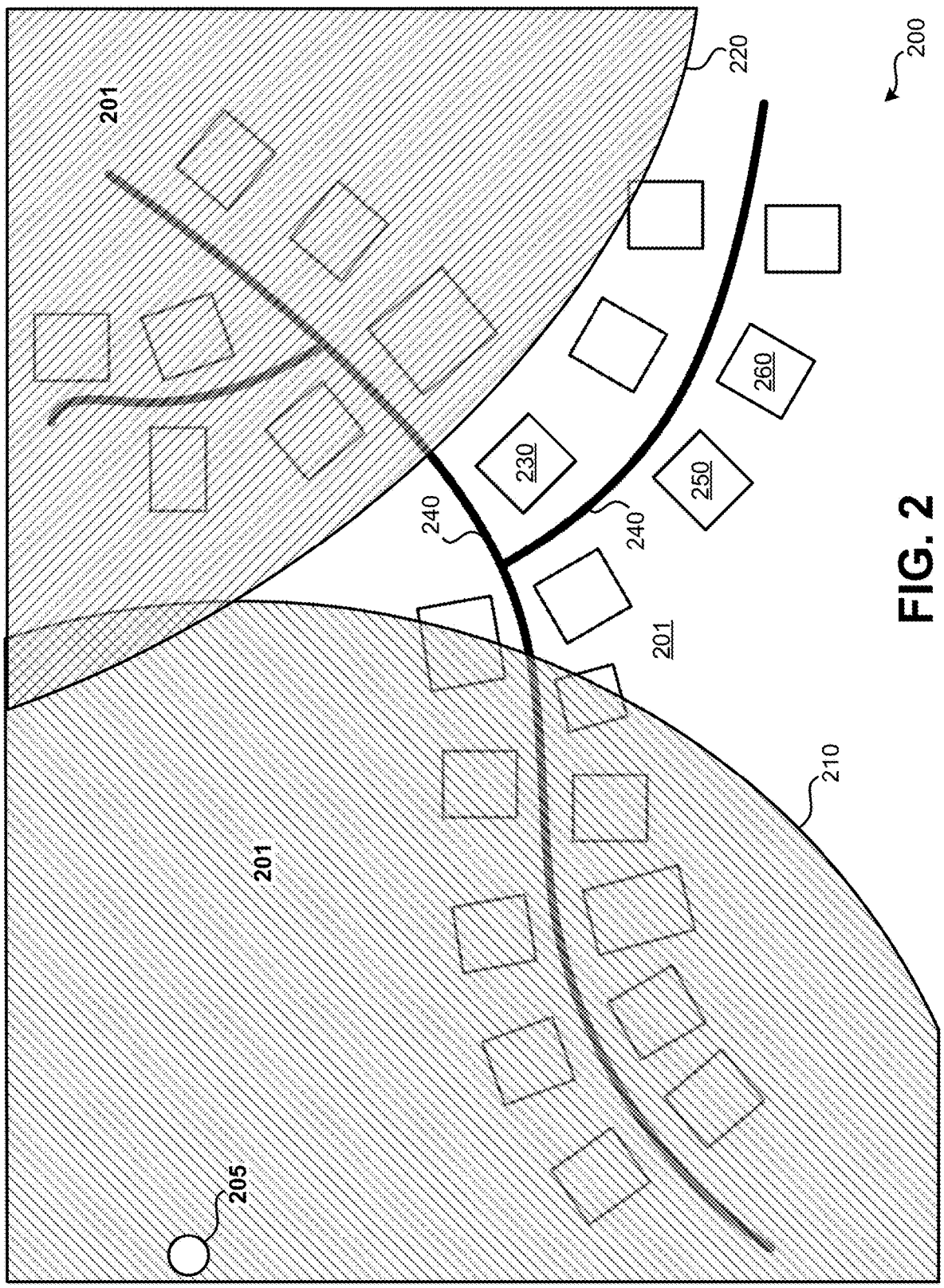
FIG. 2 illustrates a diagram of the coverage areas of a cellular network.

FIG. 2 illustrates a diagram 200 of the coverage areas of a cellular network. Diagram 200 illustrates a simplified map of cellular network coverage within neighborhood 201. Such coverage may be provided by system 100 without utilizing microcells. In a real-world implementation, cellular network coverage would be unlikely to have hard boundaries between coverage and no coverage. Rather, as an edge of coverage of a base station is reached, the ability to reliably provide a particular QoE for a given cellular service degrades. For instance, while data may be able to be exchanged between a BS and a UE, the data rate may be low enough that the user cannot effectively use his desired cellular service, such as watching video, playing a game, conduct a phone call. Said another way, the Quality of Experience (QoE) for such services may be low.

Base station 205 provides cellular service for region 210. Another base station, that is not present on diagram 200, provides cellular service for region 220. As such, a portion of neighborhood 201 does not have any or sufficient cellular network access. Rather than erecting another base station or adjusting the antennas of existing base stations, such as by adjusting the radiation pattern or power, one or more microcells may be targeted for installation in neighborhood 201 to bolster coverage of the cellular network.

Based on an analysis conducted using microcell deployment system 140, structures 230, 250, and 260 may be targeted for a microcell deployment. The entity that operates the cellular network may not have permission to unilaterally decide to deploy a microcell to such structures. For example, the structures may be private residences. However, especially for structures at which subscribers to the cellular network live or work, the entity that operates the cellular network may incentivize such subscribers to host a microcell. Communications may be sent to subscribers at one or more of the addresses associated with structures 230, 250, and 260.

The cellular network, based on the analysis conducted using microcell deployment system 140, may preferentially target addresses at which a subscriber is present and placement of a microcell will likely extend the cellular networks coverage into the dead spot while also overlapping existing coverage of the cellular network. That is, providing continuous coverage of the cellular network may be preferential to providing an "island" of cellular network coverage within the dead spot. As an example of the benefit of such an arrangement, UE present in a vehicle traveling along road 240 may experience no interruption of cellular service if a microcell is properly placed at structure 230. In contrast, if a microcell was only placed at structure 250, interruption of service while traveling along road 240 may still occur. Therefore, when targeting a particular address for deployment of a microcell, microcell deployment system 140 may take into account the location of roads, the current coverage of the cellular network, and at which addresses current subscribers to the cellular network are present.

Figure 3:
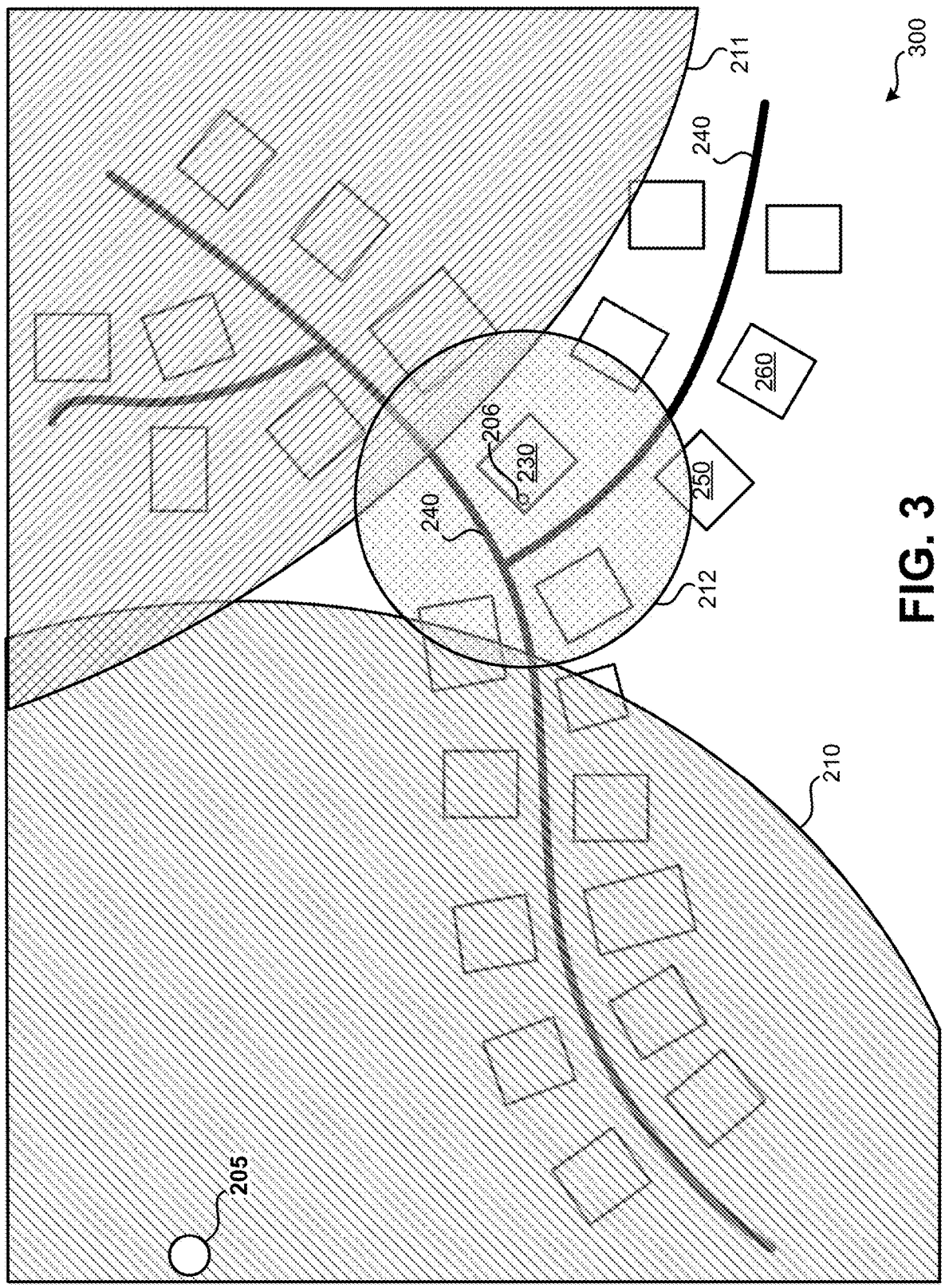
FIG. 3 illustrates a diagram of the coverage areas of a cellular network bolstered using targeted microcell installations.

FIG. 3 illustrates a diagram 300 of the coverage areas of a cellular network that is bolstered using a targeted microcell installation. In diagram 300, structure 230 has been targeted by microcell deployment system 140 for installation of a microcell. Microcell 206 provides coverage, using the same RAT (e.g., 5G) or a different RAT (e.g., WiFi) over region 212. Notably, region 212 overlaps regions 210 and 211, thus providing continuous cellular service along road 240. Over time, as UE travel along road 240, a more precise map of the coverage provided by microcell 206 may be determined. This more precise map may allow for targeting of addresses for the installation of one or more additional microcells.

Figure 4:
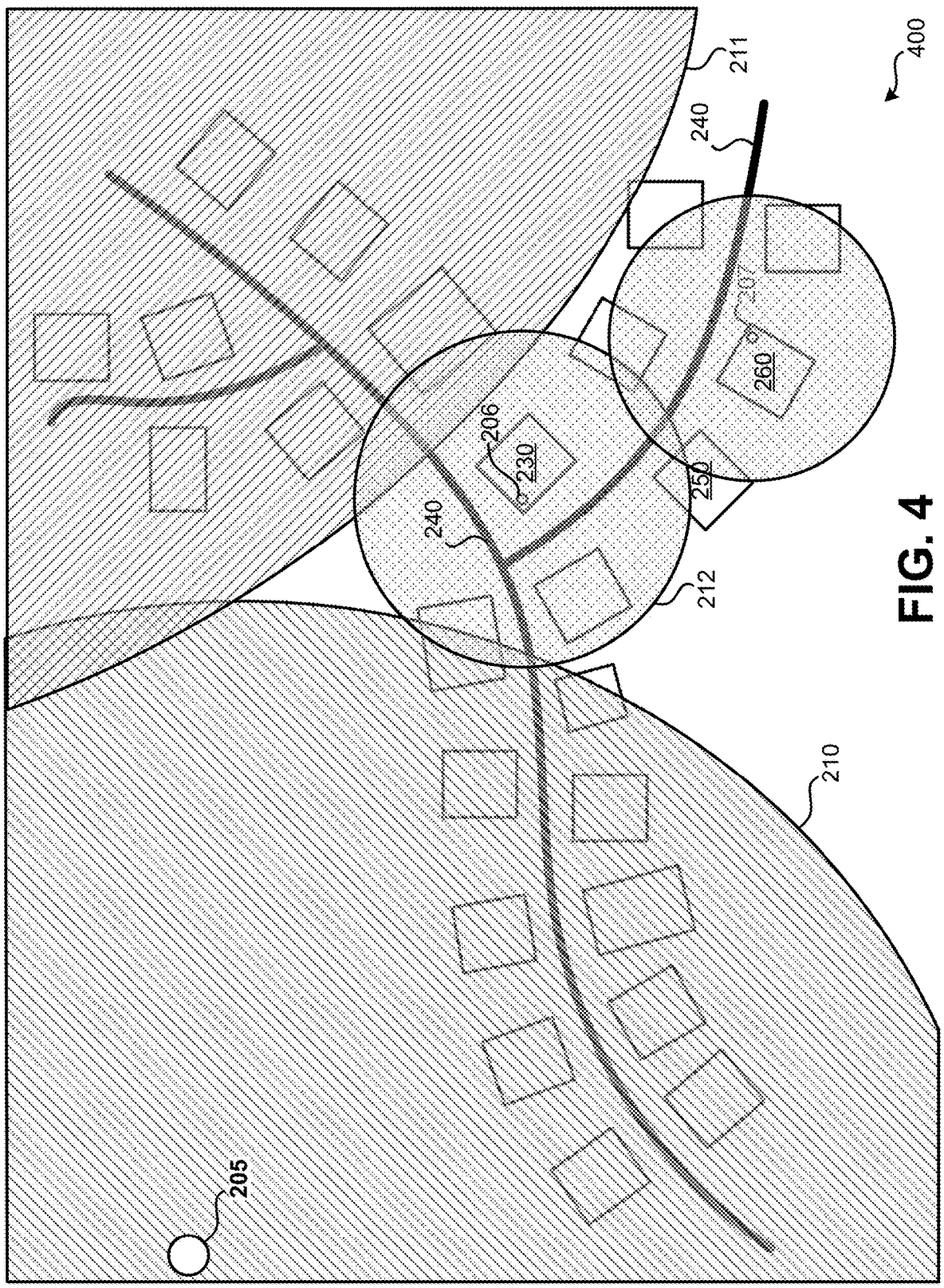
FIG. 4 illustrates a diagram of the coverage areas of a cellular network bolstered using a second-stage deployment of targeted microcell installations.

FIG. 4 illustrates a diagram 400 of the coverage areas of a cellular network that is bolstered using multiple targeted microcell installations. Microcell deployment system 140 may analyze coverage of the cellular network after microcell 206 has been installed, as detailed in relation to FIG. 3. While previously it may not have been ideal to install a microcell at structure 260, now that microcell 206 is in place, a microcell installed in structure 260 may provide overlapping and continuous coverage along road 240. As such, structure 260 may be targeted for installation of a microcell. The specific coverage provided by microcell 207 may be contingent on where inside or outside of structure 260 and antenna of microcell 207 is installed, the gain of the antenna, the radiation pattern of the antenna, and/or the make/model of the microcell. As such, the coverage area of microcell 207 may be smaller or larger than microcell 206. After microcell 207 has been installed, microcell deployment system 140 may perform additional mapping to determine if a third stage of targeted microcell installations should be performed to eliminate or decrease the dead spot.

Figure 5:
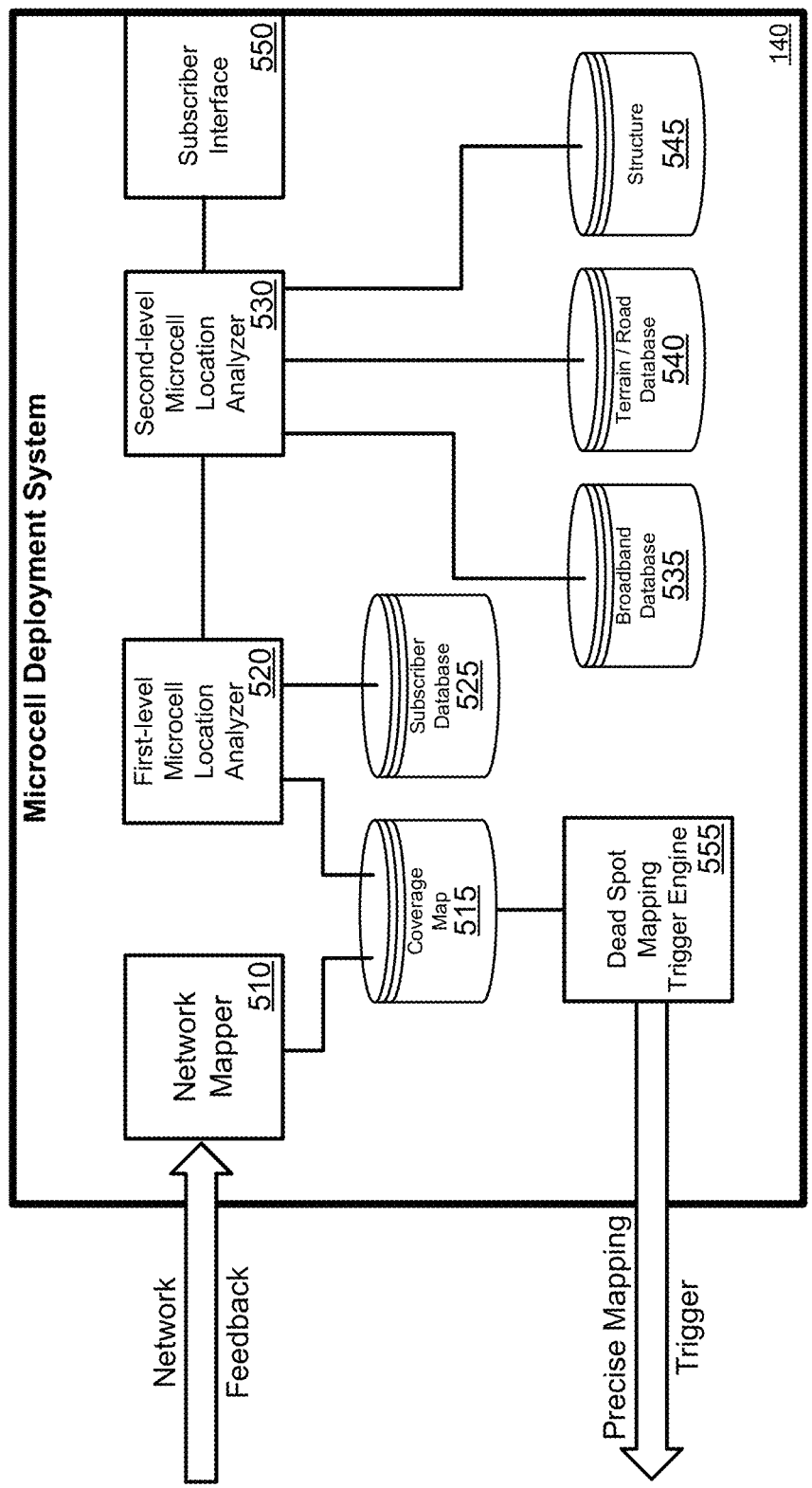
FIG. 5 illustrates an embodiment of a microcell deployment system.

FIG. 5 illustrates an embodiment of a microcell deployment system 140. Microcell deployment system 140 can include various components which can be implemented as software executed using underlying special or general purpose hardware, including one or more processors and one or more non-transitory processor readable mediums. Microcell deployment system 140 can include: network mapper 510; coverage map database 515; first level microcell location analyzer 520; subscriber database 525; second-level microcell location analyzer 530; broadband database 535; terrain/road database 540; structure database 545; subscriber interface 550; and dead spot mapping trigger engine 555.

Network mapper 510 can receive feedback from other components of the cellular network that can be used to create a coverage map stored to coverage map database 515. Various forms of data can be collected by network mapper 510 to create the coverage map that is stored to coverage map database 414. For example, network mapper 510 may receive indications of locations where dropped calls occurred. Multiple dropped calls happening near each other can be indicative of an area where coverage of the cellular network is insufficient to provide service. Network mapper 510 may also receive signal strength measurements that may be made by base stations when communicating with UE, signal strength measurements made by UE using signals received from base stations, or both. If signal strength measurements are made by a UE, the UE may transmit an indication of the signal strength measurement and the location at which the signal strength was measured to network mapper 510.

In some embodiments, based on a dead spot being identified, which may have a minimum area, a more detailed mapping may be triggered. Dead spot mapping trigger engine 555 may analyze the coverage map that is continuously or occasionally updated in coverage map database 515. When a dead spot is identified, dead spot mapping trigger engine 555 may determine whether a sufficient amount of data has been collected by network mapper 510 in the form of network feedback. If not, or simply based on a dead spot being identified, dead spot mapping trigger engine 555 may trigger a precise mapping to be performed. This precise mapping can involve a test UE being moved throughout the area of the dead spot (e.g., on a vehicle operated by or on behalf of the cellular network operator) to more precisely map the dead spot. This mapping, which may be based on signal strength measurements, can be used to update coverage map database 515.

In some embodiments, microcell deployment system 140 includes multiple microcell location analyzers that function in concert to determine the best candidate locations at which microcells should be deployed. In other embodiments, these microcell location analyzers may be combined together into a single component.

First level microcell location analyzer 520 may analyze coverage map database 515 and subscriber database 525. Subscriber database 525 may be accessed to identify addresses in the vicinity of a dead spot indicated by the coverage map at which a subscriber resides. In some embodiments, whether or not a residence or other form of structure is associated with a subscriber may not be considered or may be associated with a reduced weight. Generally, if a person is already a subscriber, they may be more likely to agree to have a microcell installed at their structure. In some embodiments, first level microcell location analyzer 520 may further analyze the coverage map from coverage map database 515 to identify an address of a subscriber at which, if a microcell is installed, the microcell will likely provide overlapping coverage with the cellular network and extend coverage of the cellular network to cover at least a portion of the dead spot.

In other embodiments, rather than prioritizing overlap, first level microcell location analyzer 520 may prioritize the address that will result in the greatest overall decrease in size of the dead spot. Since placement of a microcell at a structure is contingent on the owner of the structure agreeing to such placement, microcell deployment system 140 may attempt to identify multiple addresses at which a microcell should be installed under the assumption that at least some of the owners will not agree to such installation.

In some embodiments, first level microcell location analyzer 520 outputs an indication of one or more addresses, which may be associated with subscribers, that are candidates for placement of a microcell. These candidates may be passed to a secondary location analyzer, referred to as second-level microcell location analyzer 530. If only a single possible address (or below a threshold number of addresses) is identified by first level microcell location analyzer 520, the analysis performed by second-level microcell location analyzer 530 may be skipped. However, if more than the threshold number of addresses is identified as being potential candidate, second-level microcell location analyzer 530 may be used to further narrow which addresses are targeted for installation.

Second-level microcell location analyzer 530 may analyze various factors, which may each be assigned a different weighting, to determine which locations are preferable for hosting a microcell. The locations at the various addresses may be ranked or placed into different tiers for targeting.

Broadband database 535 may indicate addresses at which broadband service is available or already installed. Since microcells can function in a mesh, not all microcells may need to be connected to the internet. However, it may be preferable for a microcell to be directly connected to the Internet. If an address does not have broadband access, another microcell may be required to be identified as within range of communication of the address that does have broadband access. Alternatively, addresses that do have broadband access may be more favorably weighted than addresses that do not.

Terrain/road database 540 may include a mapping of terrain, roads, or both. Terrain may be analyzed to determine an amount of a dead spot that the microcell is likely to cover. For instance, an address having a structure on the top of a hill can be expected to provide more coverage than an address at the bottom of the hill. An address having a structure with favorable terrain may be weighted more favorably than an address with less favorable terrain. Continuous coverage of the cellular network on roads may be given preference over regions that do not have roads. For example, a large number of UE may pass along the road, such as in or attached to vehicles. Addresses that are likely to provide a greater amount of coverage along a road and/or continuous coverage in combination with the existing cellular network along the road may be more favorably weighted than addresses that are likely to provide a lesser amount of coverage along a road and/or do not provide continuous coverage in combination with the existing cellular network along the road.

Structure database 545 may store information about structures that are located at addresses throughout a geographic region. Such information can include: a structure type; a number of floors on the structure; a height of the structure; the size of the structure; a location of the structure at the address; and/or an exterior material of the structure. Since a microcell will likely be installed within a structure or on top of a structure, such characteristics of the structure can affect the coverage area of the microcell. For example, a brick exterior may tend to block RF signals more than a wood exterior. Based upon the characteristics of the structure indicated in structure database 545, the structure may be scored or weighted.

Following analysis by second-level microcell location analyzer 530, only a subset of addresses initially identified by first level microcell location analyzer 520 may be identified as preferable for installation of a microcell. If a ranking is produced, owners of the ranked addresses may be contacted in order of preference about having a microcell installed. If an owner declines, lower-ranked addresses may be contacted about having a microcell installed. In other embodiments, tiers of addresses are produced. At first, only the first tier may be contacted. Depending on which and how many microcells are to be installed on the first tier, a second tier may be contacted, and so on. The tiers may be created based on a ranking or weighting used to score the addresses.

Subscriber interface 550 may be responsible for contacting current subscribers of the cellular network about installation of the microcell. The benefit, if any, provided to the subscriber for successfully installing a microcell may be based upon various factors, including the scoring or weighting performed by first level and second level microcell location analyzer's 520 and 530. In some embodiments, the benefit may additionally or alternatively be based upon the performance of the microcell following installation, such as the size of the dead spot to which cellular service is provided and/or the amount of traffic the microcell hosts. The benefit could be decreased subscription cost, outright payment (e.g., cash or cryptocurrency), and/or improved service (e.g., use of a cellular network slice that provides one or more improved performance characteristics over the normal subscriber slice. Further, even if no separate benefit is provided, installation of a microcell may lead to improved service, which can be a benefit in itself. Subscriber interface 550 may send a message, such as via SMS, MMS, a push notification, email, or some other method, to a subscriber indicative of the opportunity to host a microcell. Any benefit indicated in the communication may be based on the ranking/weighting performed as part of the analysis to identify the subscriber's location as being a candidate to host the microcell.

As previously detailed, a weighting or threshold condition may be assigned to each factor. As an example, Table 1 provides scores or values for addresses identified that are in or near a dead spot. These scores or values can then be weighted to provide an overall score for each address:

TABLE 1

| Address | Subscriber? | Broadband? | Terrain Rating (1-5) | Likelihood to Provide Continuous Coverage | Structure Rating (1-5) |
|---|---|---|---|---|---|
| 60 Windward Road | No | No | 3 | 0.9 | 4 |
| 70 Windward Road | Yes | Yes | 3 | 0.23 | 4 |
| 75 Windward Road | Yes | No | 2 | 0.88 | 3 |

In the example of Table 1, terrain and structures are scored between 1-5, with 5 being the highest possibly rating. Each factor, including whether an address is a current subscriber, whether broadband is available, terrain, and whether continuous coverage (or continuous road coverage) will likely be present with the cellular network, may be assigned a weight. A score calculated for each address can then be used to separate addresses into tiers or a ranking. In some embodiments, a particular factor may serve as a threshold condition that is necessary to be present for the address to be considered a candidate. For example, it may be made a requirement that an address be a current cellular network subscriber. In some embodiments, the total calculated score may be required to be above a minimum threshold in order to receive a request to host a microcell.

In some embodiments, an algorithm based on Equation 1 can be used to score various addresses. Based upon the score, addresses can be ranked or sorted into tiers to be targeted for installation of a microcell.

$$\text{Score}=\text{Sub}(w_1*BB+w_2*T+w_3*CC+w_4*S) \quad \text{Eq. 1}$$

In Equation 1, Sub can refer to whether an address maps to a current subscriber. A value of 1 may be assigned if the address is associated with a valid subscriber, a value of 0 may be assigned if the address is not associated with a valid subscriber to the cellular network. In this example, being a subscriber is a necessary condition to receive a score; in other embodiments, it may be a weighted factor or not considered. BB can refer to whether broadband Internet access is available (in some embodiments, 1 is for broadband Internet access being available, 0 is for broadband Internet access not being available; in other embodiments, 1 is for broadband Internet access being installed at the address; 0.5 for broadband Internet access being available at the address; and 0 for broadband not being available at the address); T refers to the terrain rating; CC is based on modelling an installation of a microcell at the address to determine how likely continuous cellular coverage with the existing cellular network will exist if a microcell is installed at the address; and S is for the structure rating. Each weighting may be set based on how the cellular network provider desires to value each parameter in relation to each other. Equation 1 is merely an example and various other equations can be used to score addresses for targeting of an installation of a microcell.

Figure 6:
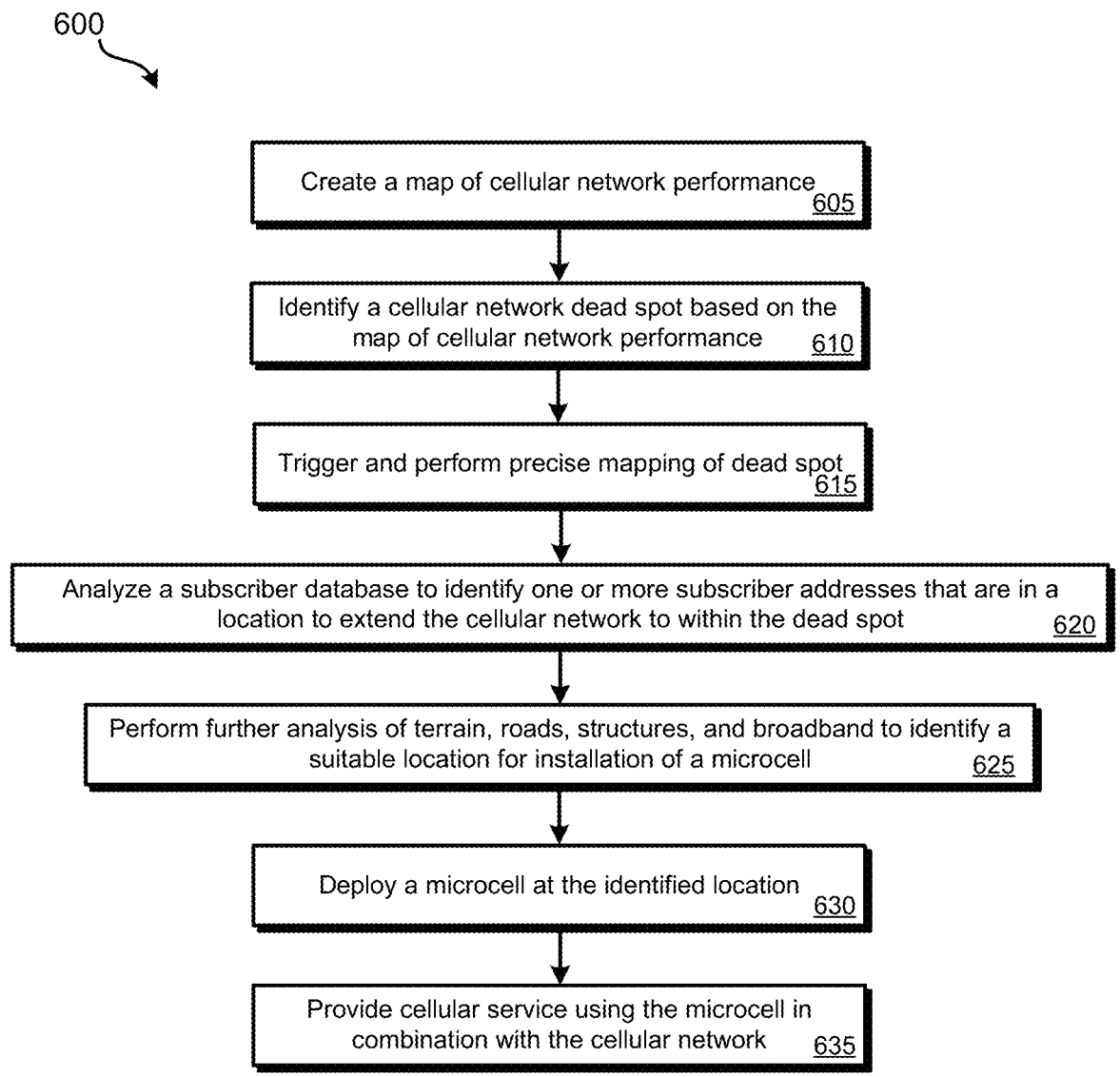
FIG. 6 illustrates an embodiment of a method for decreasing cellular network dead spots using microcells.

Various methods can be performed using the systems of FIGS. 1 and 5. FIG. 6 illustrates an embodiment of a method 600 for decreasing cellular network dead spots using microcells. Method 600 can be performed using the cellular network of FIG. 1. More particularly, blocks of method 600 can be performed using the microcell deployment system of system 100 detailed in FIG. 5.

At block 605, a map of cellular network coverage for a geographic area can be created. The map may indicate where signal strength is strong and weak. The map can be generated based on data acquired from the cellular network, including where dropped calls occurred, signal strength measurements made by UE and base stations, data transfer rates, etc.

At block 610, the geographic map of the cellular network coverage created at block 605 can be used to identify a dead spot. A dead spot is an area where coverage of the cellular network is non-existent, provides a low QoE for one or more cellular network services (e.g., video, games, phone calls, web surfing, etc.), or has a low signal strength (e.g., uplink, downlink, both).

At block 615, in some embodiments, additional mapping of the dead spot is performed to gain more information about the location, shape, and characteristics of a dead spot. Such precise mapping can be performed by triggering a UE, such as on a vehicle or UAV, to travel in the vicinity of the dead spot, to make precise measurements regarding signal strength and/or QoE. For example, a technician or UAV may make signal strength measurements in a grid pattern in and around the dead spot. This mapping data can be used to update the map created at block 605. In some embodiments, block 615 may only be performed if less than a threshold number of missed calls or signal strength measurements indicative of a dead spot are received over a defined time period.

At block 620, a subscriber database may be analyzed to identify one or more current subscribers of the cellular network that are in the vicinity of the dead spot. Modelling may be performed to identify 1) whether placement of a microcell will overlap with coverage of the cellular network; 2) whether placement of a microcell will extend coverage into the dead spot; and/or 3) how much of the dead spot the microcell is expected to eliminate. In some embodiments, coverage is intended to be extended for the cellular network, meaning that the microcell has at least some overlap with coverage of the cellular network (including active microcells). Extension may be preferable such that UE are more likely to receive continuous cellular network service compared to an island of coverage being present in the dead spot from a microcell.

In some embodiments, further analysis is performed at block 625, such as based on: terrain; roads; structures; and availability of broadband Internet access to identify a suitable address (e.g., a subscriber address) for targeting of the installation of a microcell. Each of these factors may be assigned a weight to calculate a score for the address. Addresses above a threshold score or in order of a ranking may be targeted for installation of a microcell. Targeting for installation of a microcell can include advertisements and incentives encouraging microcell installation being sent, such as via the UE, to the subscriber (or non-subscriber). The incentives may vary in value based on the likely value of a microcell being installed at the associated address. Alternatively, the incentive may be based on the performance or coverage of the microcell following installation.

At block 630, the microcell can be installed, such as by the subscriber, at the identified location. The microcell deployment system can request, as part of block 630, such an installation of the microcell. The microcell deployment system can provide the request and the subscriber may perform the installation of the microcell in response to the request. At block 635, service of the cellular network, whether via the same RAT or a different RAT, is extended using the microcell. Therefore, the microcell functions in concert with the existing cellular network to extend coverage of the cellular network.

In some embodiments, after installation of the microcell, method 600 can return to block 605, reanalyze the dead spot, and target one or more other addresses for the installation of a microcell. Therefore, blocks of method 600 can be repeated in multiple stages to use multiple installations of microcells to continuously extend (or simply improve) coverage of the cellular network in the dead spot.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for decreasing cellular network dead spots using microcells, the method comprising:
    creating, by a cellular network, a geographic map indicative of cellular network performance;
    using, by the cellular network, the geographic map to identify an area that has a dead spot;
    analyzing, by the cellular network, a subscriber database to identify a subscriber address that is in a location to extend the cellular network within the dead spot, wherein the subscriber database identifies a plurality of subscribers of the cellular network;
    based on analyzing the subscriber database to identify the subscriber address that is in the location to extend the cellular network, deploying a microcell at the subscriber address; and
    providing, via the microcell, cellular services to a plurality of user equipment.

2. The method for decreasing cellular network dead spots using microcells of claim 1, wherein creating the geographic map is based on tracking locations of dropped calls that occur for user equipment using the cellular network.

3. The method for decreasing cellular network dead spots using microcells of claim 1, wherein creating the geographic map comprises:
    measuring, by user equipment, signal strengths of signals from base stations of the cellular network;
    determining, by the user equipment, locations for the measured signal strengths; and
    transmitting the measured signals strengths with the determined locations to the cellular network.

4. The method for decreasing cellular network dead spots using microcells of claim 1, wherein the location to extend the cellular network within the dead spot is located such that coverage provided by the microcell overlaps with coverage provided by the cellular network and extends into the dead spot.

5. The method for decreasing cellular network dead spots using microcells of claim 4, further comprising:
    after deploying the microcell, analyzing, by the cellular network, the subscriber database to identify a second subscriber address that is in a second location that overlaps coverage with the microcell and extends the cellular network into the dead spot;
    based on analyzing the subscriber database to identify the second subscriber address that is in the second location to extend the cellular network, deploying a second microcell at the second subscriber address; and
    providing, via the second microcell, cellular services to the plurality of user equipment.

6. The method for decreasing cellular network dead spots using microcells of claim 1, further comprising:
    analyzing, by the cellular network, a map of broadband access, wherein deploying the microcell at the subscriber address is further based on broadband access being available at the subscriber address based on the map of broadband access.

7. The method for decreasing cellular network dead spots using microcells of claim 1, further comprising:
    analyzing, by the cellular network, a map of structures that identifies heights of structures and densities of structures, wherein deploying the microcell at the subscriber address is further based on structure height, structure density, or both at the subscriber address based on the map of structures.

8. The method for decreasing cellular network dead spots using microcells of claim 1, further comprising:
    in response to identifying the dead spot, deploying, by the cellular network, a vehicle to perform precision mapping of the dead spot, wherein analyzing the subscriber database to identify the subscriber address that is in the location to extend the cellular network within the dead spot is based on the precision mapping.

9. The method for decreasing cellular network dead spots using microcells of claim 1, wherein the cellular network is a 5G New Radio (NR) cellular network.

10. The method for decreasing cellular network dead spots using microcells of claim 1, wherein the microcell creates a 5G cell accessible by the plurality of user equipment or a WiFi network.

11. A cellular network system, comprising:
    a cellular network comprising a plurality of base stations;
    a microcell deployment system, configured to:
        create a geographic map indicative of cellular network performance;
        use the geographic map to identify an area that has a dead spot;
        analyze a subscriber database to identify a subscriber address that is in a location to extend the cellular network within the dead spot, wherein the subscriber database identifies a plurality of subscribers of the cellular network;

based on analyzing the subscriber database to identify the subscriber address that is in a location to extend the cellular network, request a microcell to be deployed at the subscriber address; and a plurality of microcells, wherein the plurality of microcells, comprising the requested microcell deployed at the subscriber address, is used to provide cellular services to a plurality of user equipment.

12. The cellular network system of claim 11, wherein the microcell deployment system is configured to creating the geographic map based on tracking locations of dropped calls that occur for user equipment using the cellular network.

13. The cellular network system of claim 11, further comprising the plurality of user equipment (UE), each UE of the plurality of UE configured to:

measure signal strengths of signals from base stations of the cellular network;

determine locations for the measured signal strengths; and transmit the measured signals strengths with the determined locations to the cellular network.

14. The cellular network system of claim 11, wherein the location to extend the cellular network within the dead spot is determined to be located by the microcell deployment system such that coverage provided by the microcell overlaps with coverage provided by the cellular network via a base station of the plurality of base stations and extends into the dead spot.

15. The cellular network system of claim 14, wherein the microcell deployment system is further configured to:

after deploying the microcell, analyze the subscriber database to identify a second subscriber address that is in a second location that overlaps coverage with the microcell and is in a location to further extend the cellular network into the dead spot; and based on analyzing the subscriber database to identify the second subscriber address that is in the second location to extend the cellular network, request a second microcell be deployed at the second subscriber address, wherein the cellular network provides cellular services to the plurality of user equipment using the second microcell.

16. The cellular network system of claim 11, wherein the microcell deployment system is further configured to:

analyze a map of broadband Internet access, wherein requesting deployment of the microcell at the subscriber address is further based on broadband access being available at the subscriber address based on the map of broadband Internet access.

17. The cellular network system of claim 11, wherein the microcell deployment system is further configured to:

analyze a map of structures that identifies heights of structures and densities of structures, wherein requesting deployment of the microcell at the subscriber address is further based on structure height, structure density, or both at the subscriber address based on the map of structures.

18. The cellular network system of claim 11, further comprising:

a cellular network operator vehicle configured to perform precision mapping of the dead spot, wherein:

the microcell deployment system being configured to analyze the subscriber database to identify the subscriber address that is in the location to extend the cellular network within the dead spot is based on the precision mapping.

19. The cellular network system of claim 11, wherein the cellular network is a 5G New Radio (NR) cellular network.

20. The cellular network system of claim 11, wherein the microcell creates a 5G cell accessible by the plurality of user equipment.

* * * * *